UNITED STATES PATENT OFFICE.

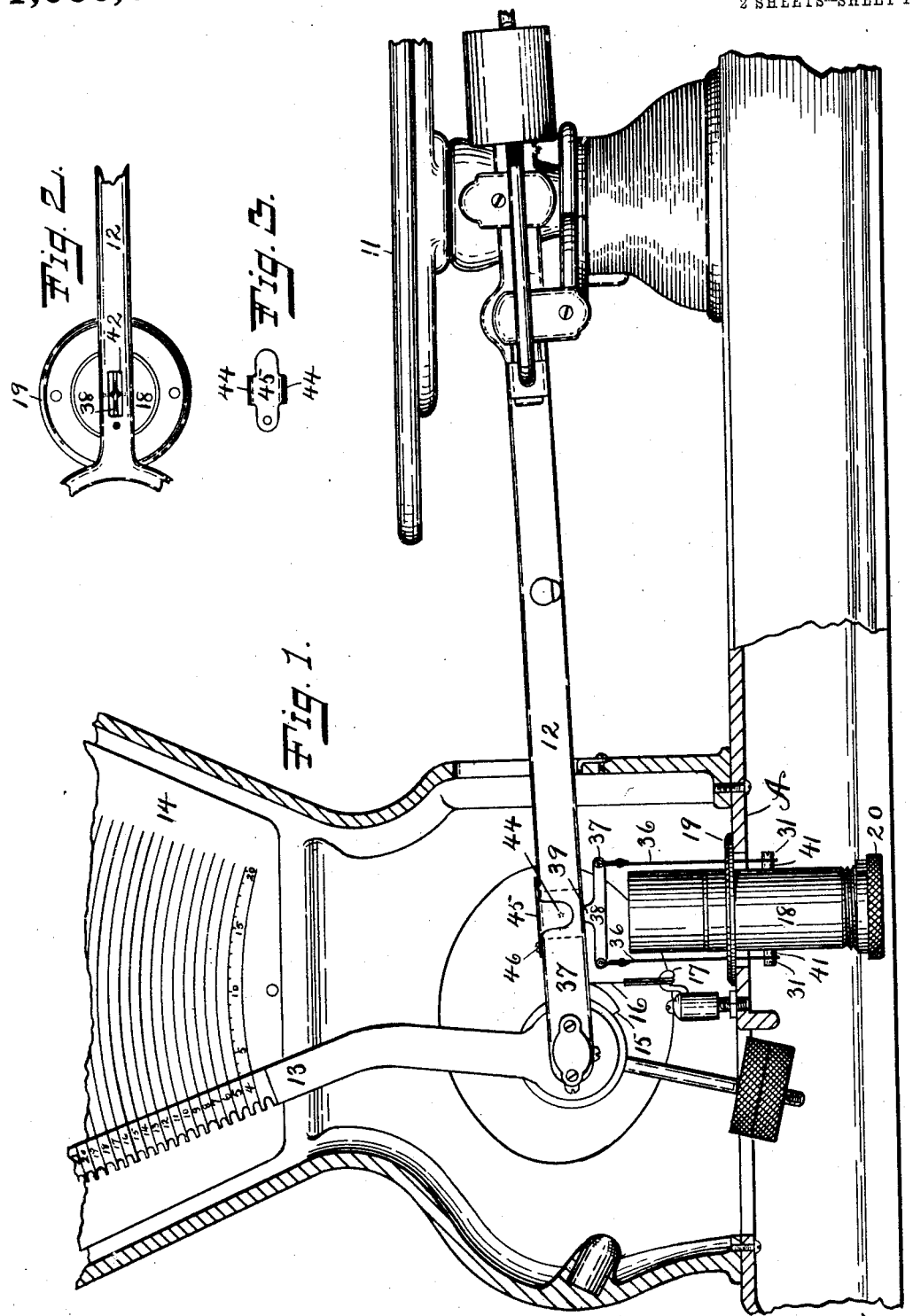

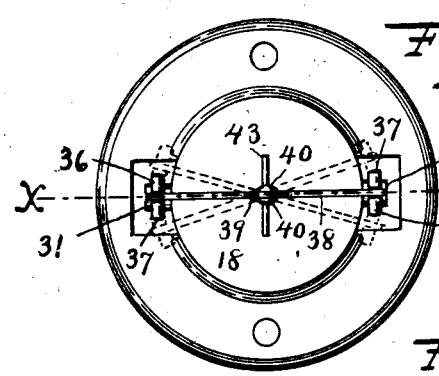
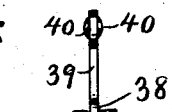
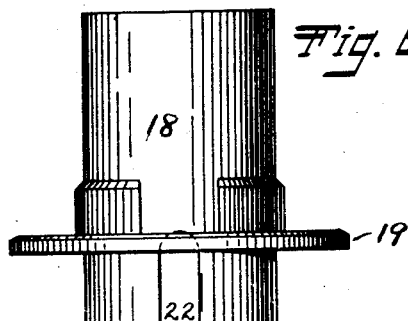
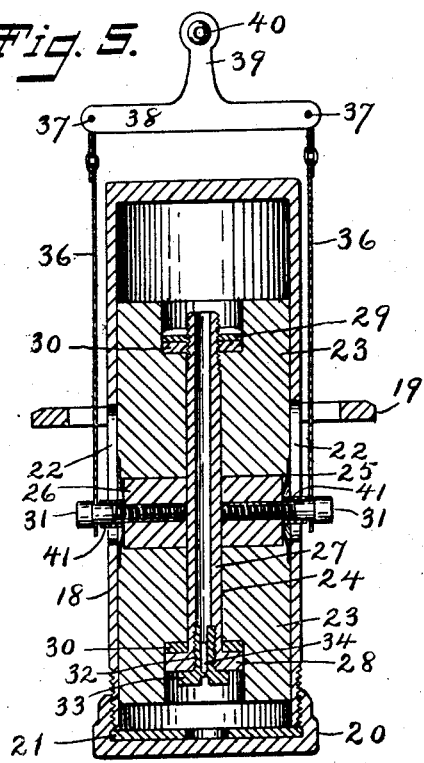
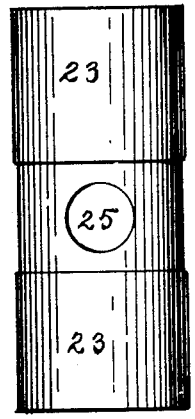
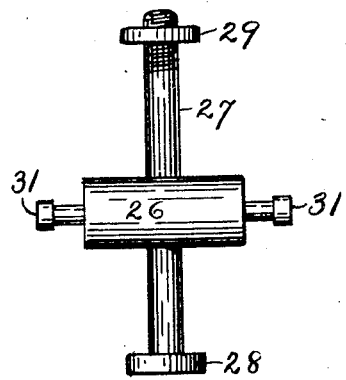
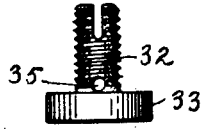

GEORGE WALKER, OF NEW BRITAIN, CONNECTICUT, ASSIGNOR TO LANDERS, FRARY AND CLARK, OF NEW BRITAIN, CONNECTICUT, A CORPORATION.

WEIGHING-SCALE.

1,060,043.  Specification of Letters Patent.  Patented Apr. 29, 1913.

Application filed November 5, 1910. Serial No. 590,821.

*To all whom it may concern:*

Be it known that I, GEORGE WALKER, a citizen of the United States, residing at New Britain, in the county of Hartford and State of Connecticut, have invented certain new and useful Improvements in Weighing-Scales, of which the following is a specification.

My invention relates to improvements in weighing scales and the main object of my improvement is an improved result in controlling the scale indicator, and in particular to have the controlling action substantially the same in weighing small and larger amounts. I also provide cheap and efficient means for attaining the aforesaid object.

In the accompanying drawings:—Figure 1 is a broken out view, partly in vertical section and partly in elevation, showing so much of a scale as is necessary in order to illustrate my improvement. Fig. 2 is a plan view of a portion of the scale beam and check connected therewith, the combined scalp and pin holder for the said scale beam, being removed. Fig. 3 is a detached plan view of the said combined scalp and pin holder. Fig. 4 is an enlarged plan view of the checking cylinder and the yoke-like link for connecting the check with the scale beam. Fig. 5 is a vertical section on the line $x$ $x$ of Fig. 4; the cross head of the link, and the screws for connecting the link with the check being in elevation. Fig. 6 is a side elevation of the cylinder. Fig. 7 is a side elevation of the graphite or main portion of the piston. Fig. 8 is a side elevation of the metal parts of the said piston, as detached from the main or graphite portion. Fig. 9 is an enlarged elevation of the regulating screw, and Fig. 10 is a side elevation of the yoke-like link or connecting mechanism, on the same scale as Figs. 4 to 8.

My improvement is designed especially for counter scales of the scale beam type for the use of retailers, but may be applied to various forms of scales that employ a pivoted weight indicator, the movement of which is due to the load that is placed upon and removed from the scales for weighing.

As herein illustrated, the major portion of the scale, less its checking devices, is made in accordance with my Patent No. 909,486, of Jan. 12, 1909, for price-scales.

In this particular scale the load receiving pan or platform 11 is connected with the short end of the scale beam 12, while an indicator 13 is pivoted to the long end of the said scale beam and moves over a suitable dial 14. The said indicator carries a cam 15, over which cam a metal strip 16 extends, one end of the said strip being secured to a part carried by the said indicator, and the other end to a hook 17 on the case A. It will thus be seen that the scale beam is a moving part that travels in reverse directions under the influence of the load and that it is through the said moving part that the indicator is moved.

In my former patent I employed a liquid check of the dash pot type. These liquid checks are fairly efficient and have heretofore been the only checks ever put into practical use for scales of the beam type. The filling of the dash pot in these checks with liquid that does not thicken or change its consistency, is a very expensive matter, and even with the best of liquid that can be had refilling from time to time is absolutely necessary. There is also a liability that the change in the consistency of the liquid may cause inaccuracy in the weight recorded unless it is watched with great care. I avoid this expense and care by the employment of a pneumatic check and I make the scale efficient to a high degree by a new construction and combination.

While liquid checks have been employed in scales of the beam type, pneumatic checks have often been used in spring scales, in which the draw bar carrying the load has a movement much greater than that of the longer end of a scale beam. In these scales the moving part of the check has been connected with the draw bar so as to move with the load, and any resistance to the movement of the said moving part has a corresponding effect on the weight indicated. That is to say the effect of the resistance is not multiplied, so that an ounce of resistance, on the part of the check, will make the weight indicated just one ounce less than the correct weight. These air checks as generally constructed require a considerable range of motion in order to furnish much resistance to the movement of the indicator and consequently while the indicator is effectually checked so as to come to a rest quickly when greater loads are being weighed so as to give a long range of movement to the check, there is but little or no checking action when the smaller loads are weighed and the range of check movement is short. With a scale beam and a check connected to the longer end of the beam, the resistance at the point of connection is multiplied several times, therefore any resistance at the point of attachment is multiplied several times in the weight indicated. For example, in a five pound scale of the type herein shown a resistance at the point of check connection equal to one ounce will develop an inaccuracy of five ounces in the weight indicated. Although the point of connection moves farther than the load, its movement is much shorter than that of the draw bar of spring scales and consequently a long range of piston movement in the check cannot be employed to check the indicator as can be done in spring scales. In the said five pound scale, the point where I connect the check with the scale beam has a movement but a little over five eighths of an inch. This makes the said connection move approximately only one eighth of an inch in weighing one pound, or one thirty second of an inch in weighing one quarter of a pound, and yet with my improved combinations and constructions the indicator moves smoothly and is efficiently checked when weighing even less than four ounces. In weighing scales, having indicator checking devices, it is not only essential that said devices shall act so as to bring the indicator quickly to rest, but it is also essential when they have thus acted, that they shall absolutely let go and permit the scale beam to come to a rest with the indicator pointing to the correct weight. This I accomplish partly by the construction of the check and partly by the construction and arrangement of the combination. In order to control the indicator under a very slight movement of the scale beam, as well as under its greater movements, I employ a double ended and double acting pneumatic check comprising a double headed cylinder and a double headed and valveless piston, the one fixed and the other movable, the piston being slidingly fitted within the cylinder for moving longitudinally thereto with a chamber of confined air at each of its opposite ends, so that both ends of the check are always in action at each stroke of the scale beam whenever it moves in either direction, one end of the check acting by compression while at the same time the other end is acting by suction, no matter which way the scale beam moves. For simplicity of construction in mounting and connecting the check, I prefer to employ a fixed cylinder and a movable piston slidingly fitted within the fixed cylinder.

18 is a double headed cylinder provided with a perforated flange 19 at about the middle of its length by means of which flange it may be seated upon and rigidly secured to the lower part of the case A, at a point directly under the longer end of the scale beam 12. The upper end or head of this cylinder is preferably made air tight by being made solid as if in one piece. The lower head or end is externally threaded and is tightly closed by a screw threaded and removable cap 20 and any suitable packing or gasket 21. The middle portion of the cylinder on each side is provided with a longitudinal slot 22 for permitting the yoke like piston link to be connected with the double headed or ended piston 23. The length of these slots is a little in excess of the range of scale beam movement at the point of its connection with the check. The body or main portion of this piston is formed of graphite in the form of a cylindrical block having a central longitudinal bore 24, Fig. 5, and a larger cross-bore 25, at a point about the middle of its length. The relative length of the piston to the cylinder and the slots in the cylinder is such that there is always a substantial length of piston closely fitted to the cylinder at the ends of the slots in said cylinder when the piston is moved in either direction to the full extent of its movement. The cylindrical graphite block may be reduced a little in diameter at its middle portion if desired, but this is not essential. The cross-bore 25 of the piston is filled by a cylindrical cross-plug 26 which plug is bored transversely to receive the body portion of the central tube 27 that fills the longitudinal bore 24. The said bore 24 is counter bored at each end and the tube 27 is provided at its lower end with a fixed head or flange 28 that is received in the counter bore, while the upper end of the tube is threaded and provided with a nut 29 that is received in the counter bore at the upper end of the longitudinal bore 24, whereby the tube may be inserted in the piston through the lower end and firmly held therein by the nut 29. An air tight joint between the piston body and the tube may be made by the employment of suitable soft washers or gaskets 30.

The cross-plug, in addition to its transverse bore, is bored centrally and longitudinally from each end and the said bore is threaded or tapped to receive the set screw 31. The lower end of the central tube 27 is internally threaded and receives into it the hollow regulating screw 32. The said screw is provided with a head 33, longitudinal bore 34 extending from its inner end to near the head, and a cross-bore 35 adjacent to the head 33, and if desired the smaller end may be split as best shown in Fig. 9, so that it may be spread a little to make it bear with friction on the inner side of the tube 13 to prevent accidental loosening of the screw. The two arms 36 of the yoke-like link are perforated at their lower ends and connected with the piston by the set screws 31 that pass through the said perforated ends into the ends of the cross-plug 26. The upper ends of the said arms are provided with hinge knuckles to receive a pintle 37 by which the said arms are jointedly connected with the ends of the cross head or yoke 38, the axis of the hinge extending transversely to the length of the cross head. The said yoke or cross head is provided with an upwardly extended middle member 39, the upper end of which is perforated and provided on each side with a boss 40 surrounding the said perforation. Aside from the said bosses this cross head or yoke is a flat plate-like member. The arms 36 are made of thin resilient metal stiff enough to resist considerable endwise strain but at the same time thin enough to bend easily in the flatwise direction. In order to prevent the lower ends of the arms 36 engaging the lower ends of the slots in the cylinder, I place collars 41 on the set screws 31 between the said arms and the ends of the cross-plug 26. This yoke like link comprising a plurality of members jointed together, (the cross head or yoke 38 and arms 36,) constitutes means for connecting a moving part of the scales with the check. Its construction and jointed connection with the piston as herein-before described, render it very flexible and yielding so that it is not liable to cramp or bind the parts. It is not only free to swing forward and backward on the set screws 31 but it can swing laterally within certain limits. It may also be twisted from the position shown by full lines into either of the positions illustrated by broken lines in Fig. 4. It is capable of practically a universal movement as it may be moved to a limited extent in every possible direction.

The flange 19 of the cylinder 18 is so placed in the length of the cylinder with reference to the flat fixed seat on the case A as to bring the said cylinder to the proper height relatively to the scale beam. The cylinder is seated on the said seat of the case with the two slots 22 within the vertical plane of the scale beam so that, as seen from the front as in Fig. 1, the arms of the yoke like link are shown in edge view while the cross head 38 of the yoke extends longitudinally of the scale beam. The cylinder is then made fast to the case in any proper manner as for example by screws passing through screw holes in the flange into the case A. The scale beam immediately over the check is provided with a vertical slot 42, Fig. 2, also indicated by broken lines in Fig. 1, which slot is wide enough to receive the member 39 of the yoke like link and its bosses. When so received the yoke like link is jointedly connected to the scale beam by a headless pin 43 passing through a transverse hole in the scale beam and through the bosses 40 of the member 39. The said bosses make the slot in the beam so wide or thick, that the length of the slender pin passing therethrough would make the said pin liable to bend if it were secured by riveting and thus prevent the proper action of the scales as to the letting go function of the check. I therefore leave the pin unheaded and secure it against moving longitudinally out of place by means of stops 44 formed on the combined scalp and pin holder 45, one stop extending downwardly at the front of the scale beam and the other at the rear so as to cover both ends of the pin 43 and hold it in place while the body of the said scalp covers the slot and the beam and gives a neat finish thereto. The combined scalp and pin holder is secured to the scale beam by means of a screw 46.

When the parts are constructed and combined as herein shown and described, neither end of the piston can ever be brought into contact with the confronting inner wall of the cylinder at either of its ends. The length of the piston and slots in the cylinder relatively to each other and the other parts is such that the stroke of the piston will always be stopped by the screws 31 coming into engagement with the metal at the opposite ends of the cylinder slots when there is a little space between the end of the cylinder and adjacent confronting inner wall. The parts are also relatively constructed and combined with reference to the movement of the scale beam so that in the complete combination the piston will never be moved quite far enough to bring the set screws 31 in contact with either end of the slots in the cylinder, hence there is always a chamber of confined air at each end of the cylinder which chambers vary in size as the air therein is forced from one chamber to the other. When the scale beam comes to a rest as shown in Fig. 1 the piston is in its lowermost position and the lower chamber of confined air is then the smaller of the two. The piston is fitted so nicely to the cylinder that it will fall down slowly of its own weight and pull downwardly with its whole weight on the scale beam, hence the scale has to be adjusted to weigh correctly after the check is combined with the scale beam. By thus dropping down by gravity to the full extent of its downward movement, the check will begin to act immediately at the first upward movement of the scale beam due to the load placed on the pan.

The screw cap 20 is readily accessible from the under side of the case and may be removed at any time to permit of the proper adjustment of the regulating screw 32, and then replaced and screwed up to make the lower end of the piston air tight. The closed ends or heads of the cylinder and the two valveless ends of the piston constitute in effect two cylinders and pistons with two chambers of confined air, while the central tube forms a communication from one chamber to the other. The two ends of the cylinder and valveless piston have like relations to each other and to the chambers of confined air which are acted upon, the one by compression and the other by suction, when the piston moves in either direction and hence they operate to check the movement of the scale beam with substantially equal resistance when moved in either direction. A piston formed mainly of a graphite block may be closely fitted to the cylinder and at the same time move easily and smoothly. A sufficient length of piston is very important in a piston thus easily fitted.

When the scale beam is moved by applying or removing its load the piston, connected therewith as herein shown and described, moves with the scale beam in the same direction and to substantially the same extent. The air that is confined within the two chambers of the cylinder moves to and from the opposite chamber through the central tube and regulating screw, and it may move faster or slower according to the adjustment of the said screw. The screw may be adjusted so as to regulate this movement very nicely and bring the indicator quickly to rest after a quite rapid movement with some vibration, or it may be adjusted so that the indicator will move at a snail's pace and come to rest when indicating the correct weight without any return movement, a result which I believe was never before accomplished in any combination of a scale indicator and a pneumatic check. With the proper adjustment the indicator comes quickly to rest whether it moves slowly or at a fair rate of speed, and this it will do when only a small load is applied to the scale.

By my improvement the piston and cylinder are double acting and act by compression and suction at every stroke so as to check the indicator with substantially equal resistance when the scale beam and piston are moving in either direction. The efficiency of the checking means is second to none and is believed to excel that of any air or liquid check ever before combined with a scale and its indicator. There is no expense for filling and refilling the cylinder and no liability of error in the weight indicated, due to a change in the consistency of the air. The air is wholly inclosed within the cylinder and external air is excluded so that no dust or dirt is drawn in to clog the adjusting screw or wear the cylinder and piston.

Although the indicator is efficiently controlled, the combination is such that the check never causes the scale to indicate an incorrect weight.

I claim as my invention:—

1. In the herein described improved weighing scale having a scale beam and a dash pot, the combination of a cross head having a central projecting member, a pin for connecting the end of the said member with the said scale beam, a pair of flat, thin and resilient arms, hinges connecting one end of the said arms to the ends of the said cross head, and pivotal devices for connecting the other end of the said arms with the said dash pot, the said pin, cross head, hinges, arms and pivotal devices constituting means whereby the scale beam and dash pot are combined.

2. In weighing scales, the arrangement and combination of an indicator and a scale beam through which the said indicator is moved, with a pneumatic check comprising a piston and cylinder, one fixed and the other movable, an inverted T shaped lever pivoted to the said scale beam by the projecting end of its middle upright member, and two connected arms, pivoted by one of their ends to the ends of the cross arm of the T shaped lever and by the other one of their ends to the movable member of the said check.

3. A pneumatic check for weighing scales comprising a cylinder longitudinally slotted on each side and closed at one end, a removable cap for opening and closing the opposite end of the said cylinder, a cylindrical piston within the said cylinder, the said piston having a longitudinal passage therethrough, a regulating screw for the said passage at the end of the piston adjacent to the said removable cap, and a yoke-like link pivotally connected by one end to the middle portion of the said check.

4. In a pneumatic check for weighing scales, a double ended cylinder solidly closed at one end and having a removable cap for tightly closing its opposite end, a double headed and valveless piston with like relations to both ends of the cylinder and the air confined therein, the said piston having a longitudinal passage extending therethrough from end to end, and a regulating screw for the said passage at that end of the said piston which is accessible through the said removable cap.

5. A double acting pneumatic check for weighing scales comprising a cylinder and piston slidingly fitted therein, one fixed and the other longitudinally movable, the said check having communicating chambers of confined air at its opposite ends.

6. A pneumatic check for weighing scales comprising a cylinder having communicating inclosed air chambers at its opposite ends and provided with longitudinal slots on the opposite sides of its middle portion, a cylindrical piston within the said cylinder longitudinally movable relatively thereto and a yoke-like link connected through the said slots to the middle portion of the said piston.

7. In a pneumatic check for weighing scales, a longitudinally reciprocating piston, a double acting cylinder therefor having communicating air chambers at the opposite ends of the said piston, each of the said chambers being cut off from communication with the external air throughout the entire range of piston movement, and a regulating screw for governing the passage of air from one of the said chambers to the other and vice versa.

8. In a pneumatic check for weighing scales, a cylinder and piston, one being longitudinally movable relatively to the other, the cylinder being tightly closed at both ends and the piston being double headed and valveless, the cylinder having communicating chambers of confined air at its opposite ends for resisting equally in either direction the movement of the piston.

9. In a pneumatic check for weighing scales, the combination of a double ended and longitudinally slotted cylinder with a piston formed mainly of a graphite block bored transversely, a cross plug fitted to the said cross bore of the said piston and screws extending through the slots at opposite sides of the cylinder into the ends of the said cross plug.

10. In a pneumatic check for weighing scales, a double headed cylinder and valveless piston with communicating chambers of confined air at their opposite ends, the said cylinder and piston being slidingly fitted with a relative longitudinal movement and their heads arranged in like manner at each end with like relations to each other and to the chambers of confined air therein, whereby one of the said chambers is acted upon by compression and the other by suction at each stroke of the piston.

11. In weighing scales, a lever, in combination with a pneumatic check and a yoke-like link comprising a cross head and two arms hinged to the ends of the said cross head by one of their ends and jointedly connected with the check at their other ends, the said cross head being jointedly connected by its middle portion with the said lever.

12. In weighing scales, the arrangement and combination of a lever, a lever-connecting member pivoted directly to the said lever, a dash pot comprising two members, one fixed and the other movable, and a dash pot-connecting member pivoted directly to the movable one of the said dash pot members, the said lever-connecting member and dash pot-connecting member being jointedly connected with each other at a point between their pivotal connection with the other parts.

13. In weighing scales, a lever in combination with a pneumatic check, a cross-head having a middle projecting member pivotally connected to the said lever with the body of the said cross-head extending longitudinally therewith, and a pair of arms hinged by one end to the ends of the said cross-head and jointedly connected by their other end with the said check at opposite sides thereof.

14. In weighing scales, a lever in combination with a check, a yoke-like link jointedly connected with the said check by one end, a headless pin pivotally connecting the other end of the said link with the said lever, and stops over the opposite ends of the said pin for engagement therewith to hold the pin against being moved longitudinally out of place.

15. In a weighing scale, the combination of a case, a lever mounted thereon, a pneumatic cylinder longitudinally slotted on opposite sides at its middle portion and provided, at the said middle portion, with a laterally projecting flange by means of which it is fixedly mounted on the said case underneath the said lever with the lower end of the said cylinder accessible from the underside of the said case, the upper end of the said cylinder being closed, a removable cap for opening and closing the opposite end of the said cylinder, a cylindrical piston within the said cylinder having a longitudinal passage therethrough, a regulating screw for the said passage at the lower end of the said piston and accessible through the capped end of the cylinder from the underside of the said case, and a yoke-like link pivotally connected by one end through the slotted cylinder, to the middle portion of the said piston and by its other end to the said lever.

16. That improvement in weighing scales which consists of the combination of a vertically moving lever, a cylinder vertically arranged underneath the longer end of the said lever and in the plane of its movement, a piston consisting mainly of a long cylindrical body of graphite, closely and easily fitted within the said cylinder with a sliding longitudinal movement relatively thereto, and, with the said cylinder inclosing a quantity of air and constituting a pneumatic check, and suitable connecting means jointedly connected by one end to the said longer end of the said lever and jointedly connected by its other end to the moving member of the said check.

17. In weighing scales, the combination of a lever, two cylinders and two valveless pistons having a relatively longitudinal movement with two chambers of confined air, the ends of the said two cylinders and of the two valveless pistons having like relations to each other and to the chambers of confined air which are acted upon the one by compression and the other by suction whenever the said pistons are moved in either direction.

18. In weighing scales, a lever, in combination with a pneumatic check and a yoke like link comprising a cross-head and two arms hinged to the ends of the said cross-head by one of their ends and jointedly connected with the check at their other ends, the said cross-head being jointedly connected by its middle portion with the said lever.

19. In a weighing scale, the combination of a case, a lever mounted thereon, a pneumatic cylinder having slotted sides at the middle of its length, and a flange on the sides of the said cylinder at its slotted portion and by means of which flange the said cylinder is fixedly mounted on the said case, a piston within the said cylinder and a yoke-like link connected through the said slotted portion of the cylinder with the said piston at one end while its opposite end is pivotally connected with the said lever.

20. In weighing scales having a pneumatic check the combination of a lever, a cylinder longitudinally slotted at its middle portion on opposite sides, a cylindrical graphite block fitted to the interior of the said cylinder, a metal cross plug mounted in the middle portion of the said block, and connecting screws extending through the slots at the opposite sides of the cylinder into the ends of the said cross plug, and means for operatively connecting the said cylinder and block through the said screws, with the lever.

21. In weighing scales, the arrangement and combination of a vertically slotted member, a dash pot, connecting means between the said member and dash pot, one end of the said means being received within the said vertical slotted member and the other end being jointedly connected with the said dash pot, a headless pin extended transversely through the said slotted member and contained end of the said means, and a combined scalp and pin holder on the said slotted member covering its slot and the ends of the said headless pin.

22. The arrangement and combination of a dash-pot with a separable connecting appliance comprising a plurality of members jointedly connected with each other and separably connected by one end with the said dash-pot, and an operating element separably connected to the opposite end of the said connecting appliance.

23. In a portable weighing scale having a pneumatic dash pot and a regulating screw therefor inside of the dash pot cylinder, the arrangement and combination of a case, a cylinder closed at its upper end and having a laterally projecting flange by means of which the said cylinder is fixedly mounted in a vertical position on the said case with its lower end projecting below the said flange and accessible from underneath the said case, and a removable cap also accessible from beneath the case for closing the said lower end and for opening the same to furnish access to the said regulating screw.

24. In weighing scales, the arrangement and combination of a scale beam, a pneumatic check comprising a fixed cylinder and a piston longitudinaly movable therein, an inverted T shaped lever pivoted to the said scale beam by the projecting end of its middle upright member, and two connected arms, pivoted by one of their ends to the ends of the cross arm of the T shaped lever and by the other one of their ends to the longitudinally middle part of the said piston.

GEORGE WALKER.

Witnesses:
 CHAS. WIEGAND,
 HARRY W. FREEMAN.